Figure 1:
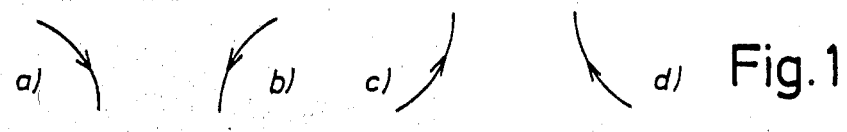

United States Patent [19]

Bergvall

[11] 4,399,760
[45] Aug. 23, 1983

[54] SEWING MACHINE FOR FANCY SEAMS

[75] Inventor: Bengt A. Bergvall, Huskvarna, Sweden

[73] Assignee: Husqvarna Aktiebolag, Huskvarna, Sweden

[21] Appl. No.: 314,362

[22] Filed: Oct. 23, 1981

[30] Foreign Application Priority Data

Oct. 30, 1980 [SE] Sweden .............................. 8007658

[51] Int. Cl.³ .............................................. D05B 3/02
[52] U.S. Cl. .............................................. 112/158 E
[58] Field of Search .................... 112/158 E, 316, 317, 112/121.11, 121.12

[56] References Cited

U.S. PATENT DOCUMENTS

| | | | |
|---|---|---|---|
| 4,122,786 | 10/1978 | Tanimoto et al. | 112/158 E |
| 4,187,789 | 2/1980 | Takenoya et al. | 112/158 E |
| 4,345,532 | 8/1982 | Eguchi | 112/158 E |

*Primary Examiner*—Peter P. Nerbun
*Attorney, Agent, or Firm*—Alfred E. Miller

[57] ABSTRACT

A programmable sewing machine has a stitch memory connected to control the needle and/or the cloth feeder. The stitch memory is addressed by an address counter, which is stepped in response to operation of the machine. The address counter is reversible, and the direction of counting therein and the presetting of an address therein is derived from a seam instruction memory responsive to a pattern selection device.

8 Claims, 4 Drawing Figures

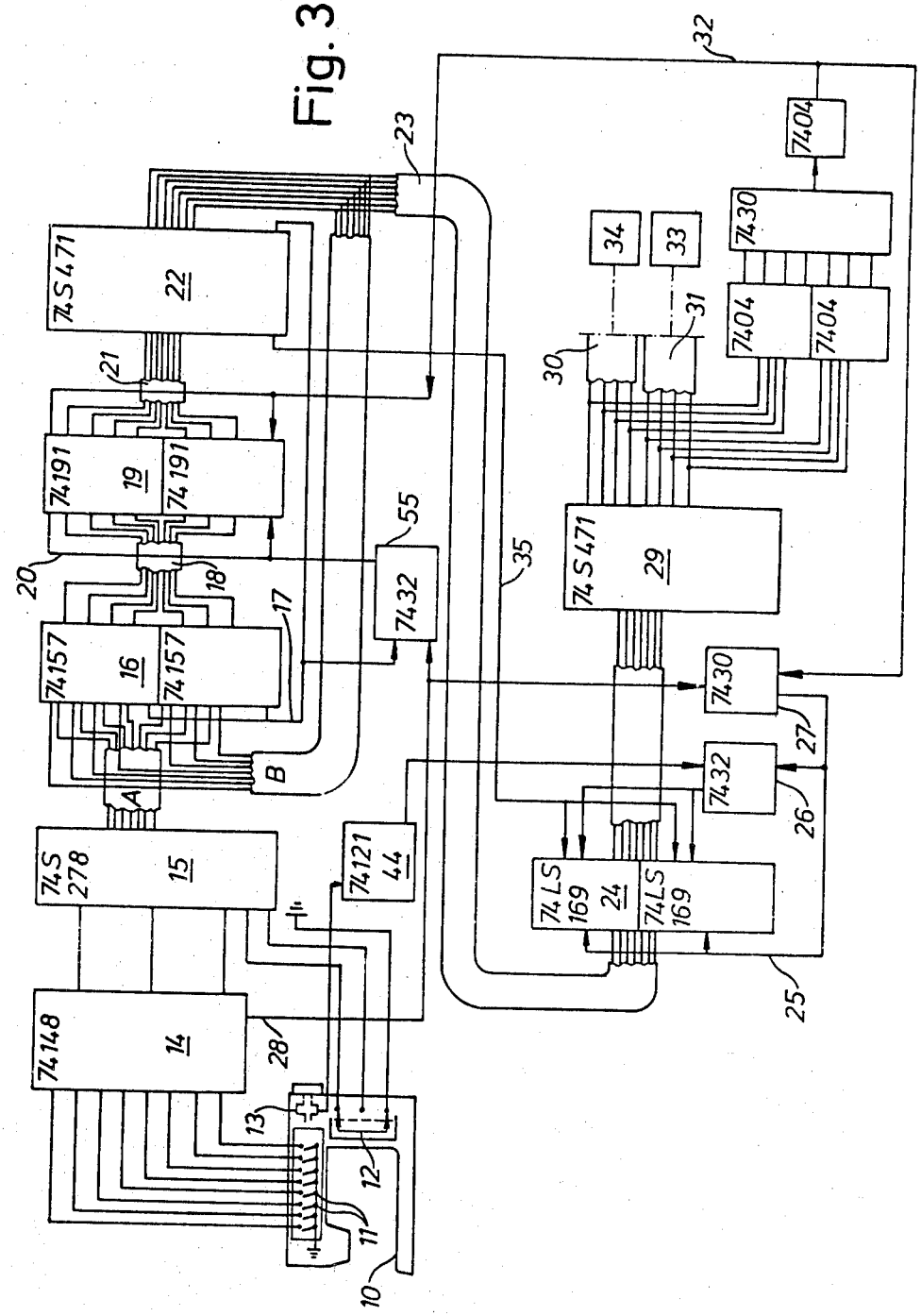

SEWING MACHINE FOR FANCY SEAMS

The present invention relates to a sewing machine for sewing fancy seams. A sewing machine with electronic pattern data circuits for the generation of signals converted into movements of the stitch forming instrumentalities of the machine, utilizing the so-called seam element principle by storing stitch data in an electronic memory, is described in Swedish patent publication No. 7905423-5. This memory, the stitch memory, determines the shape of every seam element which usually comprises a plurality of stitches. In addition, another memory is required in this machine to determine the sequence of seam elements which form the fancy seam to be sewn for each fancy seam. This second memory is called a seam instruction list.

The seam element principle allows different variations of addressing in a memory unit of the type of concern, in order to perform seam elements of a special shape. In a similar way, such as saving memory capacity by dividing the fancy seams into seam elements as described in said publication, a possibility of further utilizing the stored information is provided and hence the saving of capacity by conditionally making reflections of the seam element, as for example, in a coordinate system from one quadrant to the other. Every stored seam element can thus, besides its normal shape, be carried out in three reflected images.

The object of the invention is to provide improvements in of the pattern data circuits according to the above publication, whereby the normal shape of the stored seam element is completed with reflected shapes of the same. The solution of the problem of making such reflected elements is developed from an electronic counter for addressing in the stitch memory. When sewing the normal shape of the seam element the successive needle positions are determined by addressing in the memory by an address counter which is stepped by a pulse in synchronism with the motion of the machine, i.e. the counter releases the code words of every one of the stitches from the memory in a progressive sequence. In order to make a reflected shape of the normal seam element the successive needle positions are addressed backwards by the address counter so that the stitch to be sewn last normally now is sewn first and so on, until finally the stitch to be sewn first normally now is sewn last.

Figure 2:
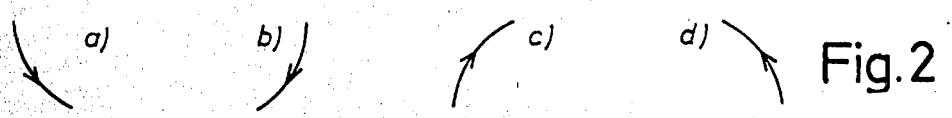
Figure 4:
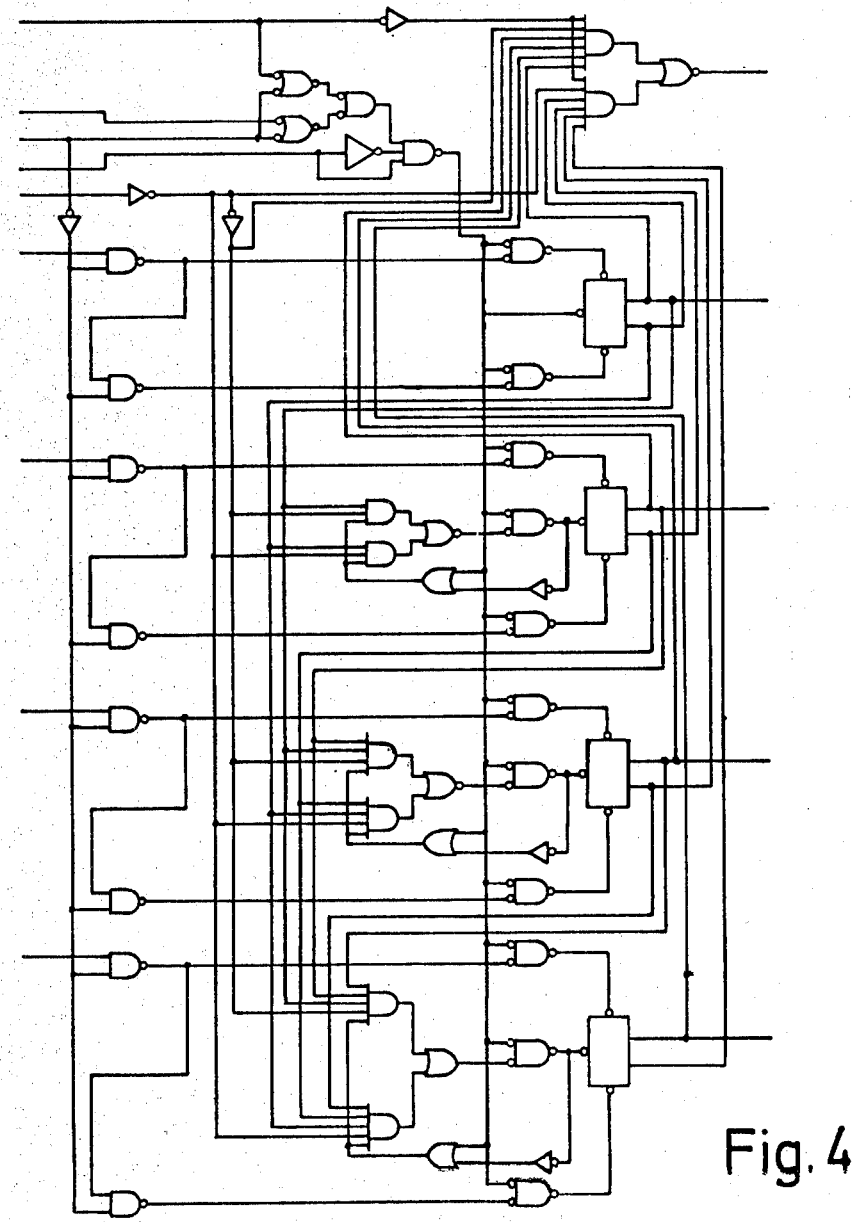

An embodiment of a sewing machine provided with electronic data circuits with the above feature is described in the following paragraphs with reference to the attached drawing, in which FIG. 1 shows examples of seam elements and their reflected images, FIG. 2 shows examples of backwards addressed seam element with reflected images, FIG. 3 is a wiring diagram of an electronic system in a sewing machine, and FIG. 4 is a wiring diagram of an address counter.

A block diagram of the electronic system according to the invention is shown in FIG 3 which includes a simple representation of a sewing machine 10 with a pattern selection device with seam selection keys 11 and a pre-selector 12 in the form of a plug-in unit. On the upper arm shaft of the machine there is a position indicator 13 which indicates the angle position of the shaft during a revolution of the machine by electric pulses and supplies these pulses to a gate. The function blocks in the diagram are standard TTL circuits and are marked by type numbers which refer to a conventional numbering system of TTL-circuits. The description of the functioning of each of these standard circuits reads as follows:

Circuit no. 74 148 Encoder. It gives a unique 3-bits code to every one of the 8 inputs that is grounded. Furthermore, it gives a signal on a separate output when one of the inputs is grounded.

Circuit no. 74 S 278 Read-only memory. 5-bits input makes $4 \times 8 = 32$ different addresses. Each address makes an 8-bits word on the output.

Circuit no. 74 157 Address selector. It selects one of the input groups A and B and applies it to the output. If B is not selected, A is. Every 74 157 can handle 4 bits.

Circuit no. 74 191. A 4-bits counter. It can be pre-adjusted to the desired 4-bits code.

Circuit no. 74 S 471 Read-only memory. 8 bits make 256 addresses. Each address gives an 8-bits word on the output.

Circuit no. 74 121 Monostable flip-flop. It gives a pulse out when the input is a logical "1."

Circuit no. 74 LS 169 Reversible counter as shown in detail in FIG. 4. It can be pre-adjusted to a desired 4-bits code and has an input related to forward/backward counting which for a logical "1" makes it count forwards and for a logical "0" makes it count backwards.

Circuit no. 7432 A logical OR-gate.

Circuit no. 7430 A logic 8-bits NAND-gate.

Circuit no. 7404 An inverter.

A large amount of the electronic system is described in greater detail in the aforesaid patent publication which describes the operations in the diagram for a selected seam element in the normal shape. For the sake of completeness the operation is here repeated in brief. When the operator pushes a key 11, one of the inputs of the encoder 14 is grounded and a unique 3-bits code is fed to a start address memory 15. This memory has a 2-bits input from the pre-selector 12 which together with the unique 3-bits code forms a so-called seam selection code. This code releases an address word in the start address memory, which is put on a wire group A (7 bits) to the A-inputs of an address selector 16. If no shift signal is present on the shift input 17 on the selector, the code on the A-input will pass the selector to the output and thence via a wire group 18 to an address counter 19. This counter is pre-adjustable so that the code on the group 18 in the presence of a signal on a trigger input 20 sets the counter on the digital number represented by the code. The address code then goes via a wire group 21 to a seam instruction list 22 in which the address word points out a memory cell storing the seam element code of the first seam element of the selected seam. The seam element code is fed via a wire group 23 to the B-input of another address counter 24 provided with a shift input 25 activated by a control circuit 26, 27 controlled by an output 28 of the encoder 14. So far the operation in the system is the same as described in the above publication. The rest of the system in FIG. 3 is different from the publication and shall now be described in detail.

Addressing in a stitch memory 29 can be carried out in several ways and the technique is substantially the same as addressing in the seam instruction list 22. The counter 24 is pre-adjustable like the counter 19 so that the code on the group 23 in the presence of a signal on the trigger input 25 adjusts the counter to the digital number represented by the code. The trigger input is connected to the control circuit 26, 27 which gives a signal of locking the code on the group 23 the locking of which, however, ceases when a pulse from the position indicator 13 makes a change in the control circuits. The output of the counter supplies an address to the stitch memory 29 in which a memory cell is then activated and emits a stitch code for positioning the needle and the cloth feeder. The first stitch of a selected seam element is carried out when the memory cell with the code of the first needle penetration is pointed out by the stitch address, and the first stitch code is then supplied on a pair of groups 30, 31. After each cycle of the machine the counter steps forwards under control by the circuits 26, 27 and provides the address to the next memory cell in the seam element to be sewn from which cell a code of the position of the next stitch will come. At the end of the seam element there is a memory cell storing a seam element end code which via an inverter and gates passes through a wire 32 to the counting control function in the counter 19. A logical "1" is now added to the digital number on which the counter was formerly pre-set. The new address code which is then supplied to the group 21 is the sum of the former code and "1". This new code points out another cell in the seam instruction list and the code of that cell is fed to the inputs of the address counter 24. Another stitch address is then present on the output which points out a cell in the stitch memory 29. The contents of this cell constitutes the code of the first stitch of the second seam element of a selected seam. Henceforth all the stitches of the second seam element are sewn by means of the operating units 24 and 29 as was formerly the case in the first seam element. The end of the seam element is marked by an end code on the wire 32 as described before.

In the function description of the counter 24 it is stated that this counter is reversible, i.e. it can step forwards as well as backwards. This gives a special feature to the system such that the number of possible patterns is essentially increased without the occupation of a greater memory capacity. The range of patterns thus enlarged is illustrated as examples in FIG. 2 which shows the patterns corresponding to the seam elements in FIG. 1 obtained by a backward addressing in the stitch memory. The elements shown in FIG. 1 are (a) the normal shape, (b) reflected in the X-axis, (c) reflected in the Y-axis, (d) reflected in both the X-axis and Y-axis. In FIG. 2 the element is shown (a) backwards, (b) backwards and reflected in the X-axis, (c) backwards and reflected in the Y-axis and (d) backwards and reflected in both the X- and Y-axis. An arrow on all elements shows the feed direction when sewing the element. The elements in the figures have, in pairs, the same shape, i.e. 1a and 2d but the feed direction of one element is opposite to that of the other. The feeding direction is essential when sewing a plurality of seam elements, one after another and for sewing a pattern combination of for example the seam elements 1a and 1c, it is necessary to substitute 2d for 1a since the feeding direction must be the same during the sewing of the two elements (i.e. the arrows shall be directed in the same way). The same memory cells in the stitch memory are used: 1c is obtained by backwards addressing by a reversed feeding and an inversion "left to right" of the needle's zig-zag positions. A reversed feeding and an inversion "left to right" can be carried out in a well-known manner by inverting the codes on the groups 31 and 30 respectively by means of inverters 33,34.

All seams are sewn on instruction from the seam instruction list 22, even the elements in the backward addressing. On a wire 35 "1" and "0" are transferred to the counter 24 which counts forward for "1" and backward for "0". The instruction on the group 23 is thus completed by the information on the wire 35. In other respects the addressing is carried out by analogy with the previously described system.

I claim:

1. In a sewing machine for sewing fancy seams and having means for positioning the needle and/or the cloth feeder, a stitch memory connected to apply stitch codes representing at least one fancy seam to said positioning means, an address counter connected to address said stitch memory, pulse generator means responsive to operation steps in said machine and connected to control said address counter, said machine further having a pattern selection means for producing seam selection codes; the improvement wherein said address counter is reversible, and further comprising a seam instruction memory responsive to said seam selection code and connected to apply a seam element code and counting direction instructions to said address counter.

2. The sewing machine of claim 1 wherein said address counter is connected to be preset to said seam element code and to count forward or backward therefrom in response to said counting direction instruction.

3. The sewing machine of claim 2 comprising means connected to said stitch memory for producing an end code when a group of stitches is sewn, and further comprising means applying said end code to said seam instruction memory.

4. The sewing machine of claim 3 wherein said seam instruction memory is connected to preset said address counter to a seam element code constituting the address in said stitch memory for the first stitch code of a selected group of stitches.

5. The sewing machine of claim 4 wherein said seam instruction memory is coupled to control said address counter to count in a forward direction.

6. The sewing machine of claim 3 wherein said seam instruction memory is connected to store instructions for presetting said address counter to a number constituting the address in said stitch memory for the last stitch code of a group of stitches stored in said stitch memory.

7. The sewing machine of claim 6 wherein said seam instruction memory applies a count direction instruction to said address counter for counting in the backward direction.

8. In a sewing machine for sewing fancy seams and having means for positioning the needle and/or the cloth feeder, a stitch memory connected to apply stitch codes representing at least one fancy seam to the positioning means, an address counter connected to address said stitch memory, means responsive to operation of said sewing machine for controlling said address counter, and means for storing an address in said counter corresponding to an address in said stitch memory of a seam to be sewn; the improvement wherein said address counter is reversible, and furthr comprising a seam instruction memory, means responsive to the selection of a pattern in said machine for controlling said seam instruction memory, said seam instruction memory having an output connected to preaddress the address stored in said address counter, and an output connected to control the direction of stepping of said address counter.

* * * * *